Jan. 18, 1949  E. K. JONES  2,459,531
CATALYST ABSORPTION
Filed Jan. 1, 1945
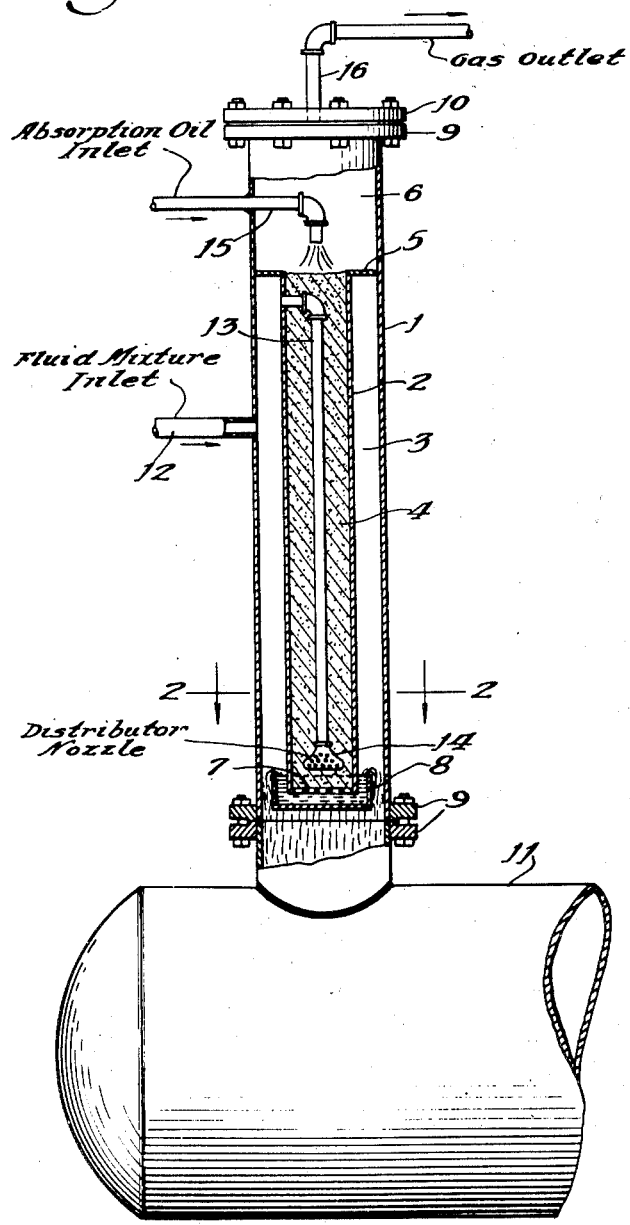
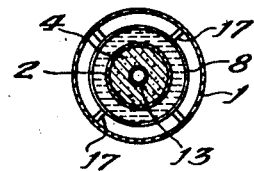
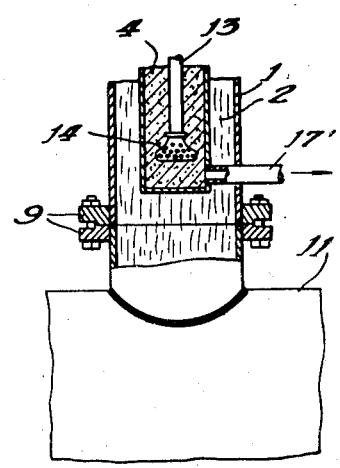
Inventor:
Edwin K. Jones
By: Lee J. Gary
Attorney Patented Jan. 18, 1949

2,459,531

UNITED STATES PATENT OFFICE 2,459,531

CATALYST ABSORPTION

Edwin K. Jones, Ponca City, Okla., assignor to Universal Oil Products Company, Chicago, Ill., a corporation of Delaware Application January 1, 1945, Serial No. 571,007

5 Claims. (Cl. 261—94)

This invention relates to a method and apparatus for the recovery of the relatively small portion of a component or components which become dissolved or entrained in the reaction products stream of a chemical conversion process; the components to be recovered being of a higher vapor pressure than the reactants and/or reaction products, and normally lost in gaseous form subsequent to the reaction process.

Broadly the process comprises passing the mixture containing the desired components in substantially liquid phase from a zone of relatively high pressure to a zone of relatively low pressure, conducting released vapors containing the desired product therefrom to an absorption zone. In the absorption zone the component or components may be selectively absorbed by a suitable absorption medium, allowing the residual light gases or vapors to be removed therefrom relatively free of the desired component or components.

The apparatus of the invention comprises a combined flash chamber and absorber column. The absorber is placed internally within the flashing section such that the process of flashing results in a cooling action on the absorber within, thereby acting to increase the efficiency of the absorption stage. Further, the preferred form of the apparatus is so constructed that the recovered product and absorption medium is withdrawn from the lower end of the absorber section to commingle with the unflashed products at the lower end of the flash section. The resultant mixture with the recovered product may then be discharged for further treatment.

In a slightly different embodiment of the invention an alternate form of the apparatus may be used. The alternate form or construction is such that an absorption medium and recovered component is discharged from the lower end of the absorption section separate from the stream of unflashed products, the latter being withdrawn from the lower end of the flash chamber section.

This alternate construction allows similar recovery means, but is used when it is undesirable to commingle the unflashed products and the absorption medium.

The method and apparatus of this invention is particularly adaptable for use in connection with the alkylation of hydrocarbons.

By way of explanation, in the hydrofluoric acid alkylation process, one of the widely used commercial processes, isoparaffins are reacted with olefin hydrocarbons in the presence of hydrofluoric acid (HF) as a catalyst, to produce higher molecular weight, branched chain hydrocarbons known as alkylate. It is of course economical and desirable to separate and save for reuse, as large a percentage of the HF as is possible.

In the present recovery process, the major portion of the HF catalyst is separated in a settling tank by gravity from the hydrocarbon products withdrawn from the reaction zone; however, a small percentage of HF becomes dissolved in the hydrocarbon stream and further recovery is made by fractionation. The hydrocarbon phase is carried to a charge tank where the light gases are vented and the liquid stream is charged to the HF fractionating column or stripper. The overhead vapors of the fractionating step contain all of the HF and part of the lighter hydrocarbons, which are condensed and returned to the process reactor. The gases which remain uncondensed from this recovery process outlined, and are vented from the charge tank to the HF stripper, still contain appreciable amounts of HF which may be substantially recovered by the method and apparatus of this invention.

The application of this invention to the HF alkylation process comprises placing the apparatus in the circuit to the HF stripper or fractionating column. The separated hydrocarbon phase containing the dissolved and entrained HF is passed from the settling tank to the flash chamber section of the apparatus which is the outer chamber of the combined apparatus of the invention. The liquid phase continuously flashes from a high pressure at approximately cooling water temperature to a lower pressure and temperature. The gas from the flashing step is passed through a conduit to the lower end of the absorber section or internal chamber of the apparatus and therein the gas flows upward through a contact bed of Raschig rings or the like, countercurrent to a downflowing stream of an absorption medium. In the preferred form of apparatus, heavy alkylate may be used to effect substantially complete removal of the HF catalyst and some of the light hydrocarbon vapors, allowing only propane and lighter gases as the principal unabsorbed gas to be vented from the top of the absorption section. The flash chamber absorber apparatus is preferably mounted over and connected to a tank or horizontal vessel which receives the unflashed liquid part of the hydrocarbon stream together with the alkylate absorption medium, and the absorbed HF acid catalyst and hydrocarbons, which are discharged through a liquid trap at the bottom of the absorber section.

In the alternate form of the apparatus a different absorption medium such as butane-butylene mixture, for example, may be used to effect recovery of the HF catalyst, the mixture of butane-butylene being available as charge reactants to the reaction alkylation phase. The combination flash chamber and absorber column may still be mounted as in the preferred form above. However, only the unflashed liquid of the hydrocarbon stream will be received by the tank below the end of the flash chamber section. A separate withdrawal conduit provided at the lower end of the absorber column allows the absorbing butane-butylene and the absorbed HF to be charged to the reaction chambers or contactors to go with the principal charge streams.

The flashing of the liquid phase, in the flash chamber portion of the combination vessel, is an endothermic action such that the internal absorber column is cooled from the outside. This cooling action is advantageous to the efficiency of the absorber in its operation of removing the HF flowing upward through the contact bed; also, if more cooling surface is needed or desired, fins may be built onto the wall of the internal absorber column.

While the use of the apparatus of this invention has been directed to HF acid catalyst absorption in some detail, it is not intended to limit its use entirely to this product, since it may well be of use in effecting more complete recovery of other catalysts or chemical components in other chemical conversion processes.

The features and operation of the invention should be more apparent with reference to the accompanying drawing and the following description thereof.

Figure 1 is a sectional elevation of a recovery apparatus coming within the scope of this invention wherein the separation and absorption of catalyst takes place.

Figure 2 is a sectional plan through the body of the apparatus.

Figure 3 is a sectional elevation of the lower portion of the apparatus, showing an alternate form of the invention.

Referring now to Figure 1, the recovery apparatus consists of an outer shell 1 and an inner shell 2 with the annular space 3 therebetween serving as the flash chamber section. The absorption section is contained within shell 2 and is filled with a contact packing 4, such as Raschig rings, berl saddles, or the like; also an absorption section which uses bubble decks and caps, side to side pans, etc., for contact means may come within the scope of this invention. A close-off sheet 5 serves to separate the flash chamber section 3 from the upper portion 6 of the absorption section. A grating or perforated plate 7, is provided at the bottom of the absorber column 2 in order to support the bed of Raschig rings 4, but at the same time it allows downflowing absorbing liquid to be discharged. A circular tray 8 is positioned below the absorber 2 such that it will provide a liquid trap or vapor seal to the bottom of the chamber 2. Flanges 9 are shown top and bottom of the apparatus, at the top so that the cover 10 may be removable for access to the interior, and at the bottom so that the apparatus may be attached to the charge tank 11.

The fluid mixture is introduced through conduit 12 to the flash chamber 3, where the gases from the flashing process will pass into the conduit 13, while liquid which did not flash can drop directly into the charge tank 11 below. The gases entering conduit 13 are carried to the bottom of the contact bed 4 in the absorber 2 and discharge through a distributing nozzle 14, such that the gas can ascend through the bed 4 and be contacted by a descending liquid stream of an absorption medium entering the top of the absorber 6 through conduit 15. Any unabsorbed gases after passing through the absorber 2 will be vented through an outlet conduit 16 at the top of the unit.

In Figure 2 the apparatus is shown in section at the plane indicated by the line 2—2 on Figure 1. Brackets or web plates 17 are indicated, which is one method of supporting the tray 8 from the shell 1. The other members are marked as shown in Figure 1 and have been previously described.

In Figure 3 the alternate construction of the apparatus is shown, having discharge means from the lower end of the absorption column 2 by the conduit outlet 17'. The liquid trap 8, and the grating 7 of Figure 1 are thus eliminated by this construction. The balance of the apparatus remains unchanged and is numbered the same as for Figure 1.

In a specific example of the operation of this invention as shown by Figure 1 it will be assumed that the remaining HF catalyst is to be absorbed from the vent gases at the charge tank to the HF fractionator or stripper in combination with the previously mentioned recovery system of an alkylation process.

The hydrocarbon phase still containing some HF from the HF settler tank is passed to the flash chamber section 3 by conduit 12 at approximately cooling water temperature and at a pressure sufficient to maintain a substantially liquid phase and which will be greater than the relatively low pressure maintained in the chamber 3. Flashing occurs with the HF gases and light hydrocarbon gases entering the conduit 13 and being passed to the outlet nozzle 14 at the lower end of the absorber 2 and contact bed of Raschig rings 4. An absorption medium is introduced at the top of the absorber 2 through conduit 15, and may be heavy alkylate (the alkylation reaction product), since a circuit of this product is provided throughout the plant for pump flush oil, etc. This heavy alkylate flows to the top of the contact bed 4 at a proper rate and volume in order to absorb all of the HF in the vapors flowing upwardly through the column 2. In addition some of the hydrocarbon will be absorbed, such that essentially all that will be vented at the top of the apparatus through conduit 16 will be propane. The downflowing absorption alkylate together with the absorbed components will be discharged from the bottom of column 2, through the grating 7, overflowing the sides of the tray 8, which provides the liquid trap at this point, and dropping into the charge tank 11 from which it again enters the HF fractionator.

To give an example of the operation of the invention as provided by Figure 3 of the drawing, it will again be assumed that HF catalyst is to be recovered from the vent gases as previously described in connection with an HF alkylation process. In this alternate example, it will be assumed that a butane-butylene mixture is used as the absorption medium. Herein butane and butylene are common charge reactants alkylated in the HF alkylation process, also it is known and has been demonstrated that this mixture is a very good absorption medium for HF.

Referring to Figures 1 and 3, the hydrocarbon phase still containing some of the HF is passed to the flash chamber section 3 by conduit 12 at about cooling water temperature and a pressure sufficient to maintain a liquid phase. Flashing occurs in the upper part of section 3 at a substantially lower pressure. Released HF and light hydrocarbon vapors enter the conduit 13 being passed to the outlet nozzle 14 at the lower end of the absorber 2 and contact bed 4. The absorption stream of butane-butylene is introduced at the top of the absorber 2 through conduit 15 and allowed to flow downward through the contact bed 4. The pressure maintained in the upper section 6 should be only slightly lower than the pressure in the flash section, being as high as is practicable in order to eliminate excessive loss of butane-butylene vapors. The rate of flow and volume should be that required to absorb all of the HF in the vapors flowing upwardly through the contact bed in column 2. The absorption medium and recovered HF is withdrawn through conduit 17' while residual uncondensed vapors will be removed from the top of the column through conduit 16. Unflashed liquid from the hydrocarbon charge phase can drop from the lower end of the flash chamber 3 to the vessel 11 below. For the alkylation process of this example the withdrawn butane-butylene and recovered HF may be carried to the alkylation reaction zone and used as additional charge material.

The operation and use of the apparatus of this invention has been described in connection with the HF alkylation process; however, as before stated it is not the intention to limit the use of this invention to the absorption of hydrogen fluoride only since it may be used similarly for other acid catalysts or for recovering other materials used in still different processes.

I claim as my invention:

1. An apparatus for the recovery of a desired component by selective absorption comprising inner and outer shells providing thereby an inner chamber and an outer chamber, means forming said inner chamber into upper and lower sections, and to maintain separate said outer chamber from the upper section of said inner chamber, a conduit for vapor communicative with the upper portion of said outer chamber and leading to a distributing nozzle positioned in the lower end of said inner chamber, means providing gas and liquid contact in the lower section of said inner chamber, an inlet conduit for liquid connected to said outer chamber, an inlet conduit for liquid and an outlet conduit for vapor connected to the upper section of said inner chamber, each of said chambers having liquid outlet means from the lower ends thereof and discharging into a common conduit.

2. An apparatus for the recovery of a desired component by selective absorption comprising inner and outer shells providing thereby an inner chamber and an outer chamber, a ring shaped dividing plate forming said inner chamber into upper and lower sections and maintaining separate said outer chamber from the upper section of said inner chamber, a conduit for vapor communicative with the upper portion of said outer chamber and leading to a distributing nozzle positioned in the lower end of said inner chamber, contact packing material placed in the lower section of said inner chamber, an inlet conduit for liquid connected to said outer chamber, an inlet conduit for liquid and an outlet conduit for vapor connected to the upper section of said inner chamber with the last named inlet conduit extending into said inner chamber so as to discharge centrally over said packing material in said lower section, a tray positioned below said inner chamber in a manner providing a liquid outlet and a liquid seal, liquid outlet openings at the lower ends of each of said chambers, discharging through the lower end of said outer chamber to a common receiving vessel.

3. An apparatus for the recovery of a desired component by selective absorption comprising inner and outer shells providing thereby an inner chamber and an outer chamber, a ring shaped dividing plate forming said inner chamber into upper and lower sections and maintaining separate said outer chamber from the upper section of said inner chamber, a conduit for vapor communicative with the upper portion of said outer chamber and leading to a distributing nozzle positioned in the lower end of said inner chamber, contact packing material placed in the lower section of said inner chamber, an inlet conduit for liquid connected to said outer chamber, an inlet conduit for liquid and an outlet conduit for vapor connected to the upper section of said inner chamber with the last named inlet conduit extending into said inner chamber so as to discharge centrally over said packing material in said lower section, an outlet conduit for liquid from the lower end of said inner chamber passing through and exterior to said outer shell and a liquid outlet opening at the lower end of said outer chamber.

4. An apparatus of the class described comprising an outer chamber, an absorption chamber disposed concentrically within the outer chamber, a liquid inlet conduit for the outer chamber, a vapor conduit within the absorption chamber providing communication between the upper portion of the outer chamber and the lower portion of the absorption chamber, means for supplying absorption liquid to the upper portion of the absorption chamber, and means for discharging liquid from the lower portion of each of said chambers.

5. An apparatus of the class described comprising an outer shell, a partition dividing the interior of the shell into an upper section and a lower section, an inner shell depending from said partition into said lower section and spaced from the outer shell, said inner shell forming an absorption chamber communicating through said partition with the upper section of the outer shell, an inlet conduit for liquid connected to said lower section of the outer shell, a vapor conduit within said chamber providing communication between the upper portion of said lower section and the lower portion of the absorption chamber, an inlet conduit for liquid and an outlet conduit for vapor connected to said upper section of the outer shell, and means for discharging liquid from the lower portion of the absorption chamber.

EDWIN K. JONES.

REFERENCES CITED

The following references are of record in the file of this patent:

UNITED STATES PATENTS

| Number | Name | Date |
|---|---|---|
| 784,599 | Studabaker | Mar. 14, 1905 |
| 1,107,803 | Koppers | Aug. 18, 1914 |
| 1,422,183 | Curme | July 11, 1922 |
| 1,463,782 | Armstrong | Aug. 7, 1923 |
| 1,621,821 | Armstrong | Mar. 22, 1927 |
| 2,302,130 | Leech | Nov. 17, 1942 |
| 2,371,341 | Matuszak | Mar. 13, 1945 |